Oct. 15, 1946.    G. E. BOCK    2,409,467
APPARATUS FOR TESTING THE BRAKES ON AIRPLANE GROUND WHEELS
Filed Jan. 23, 1943    4 Sheets-Sheet 1
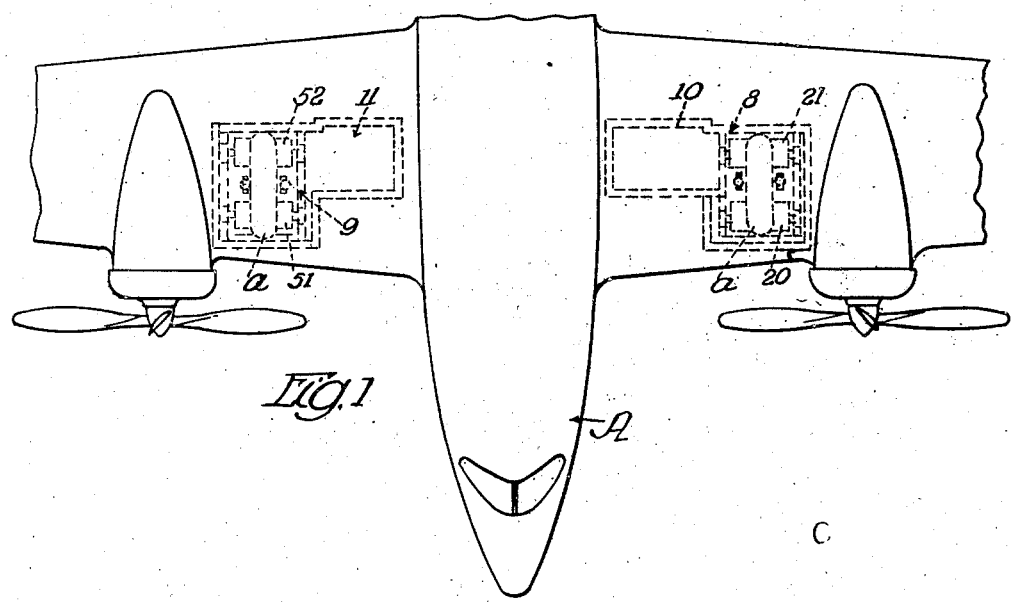
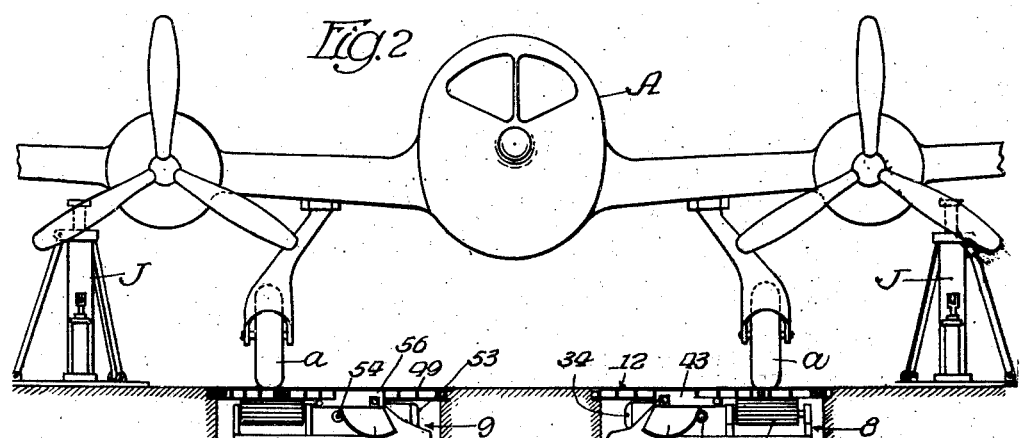
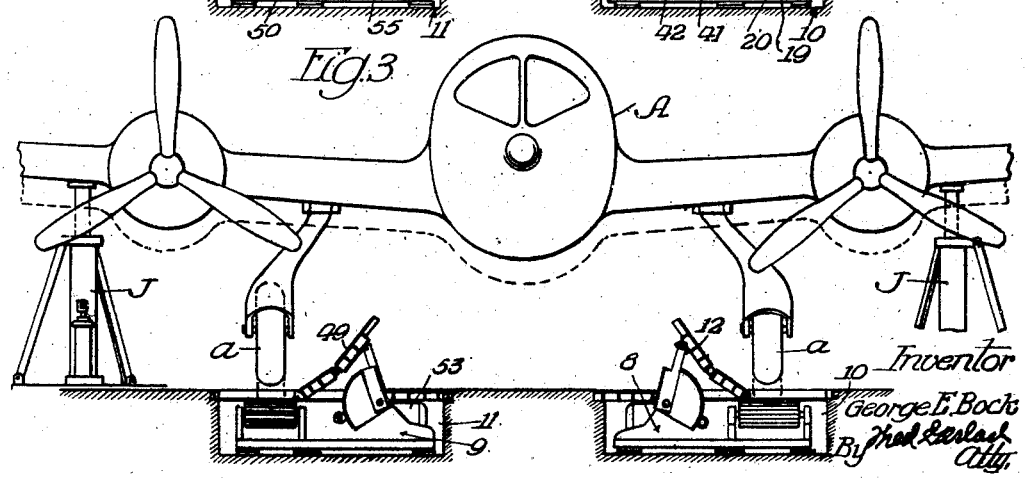

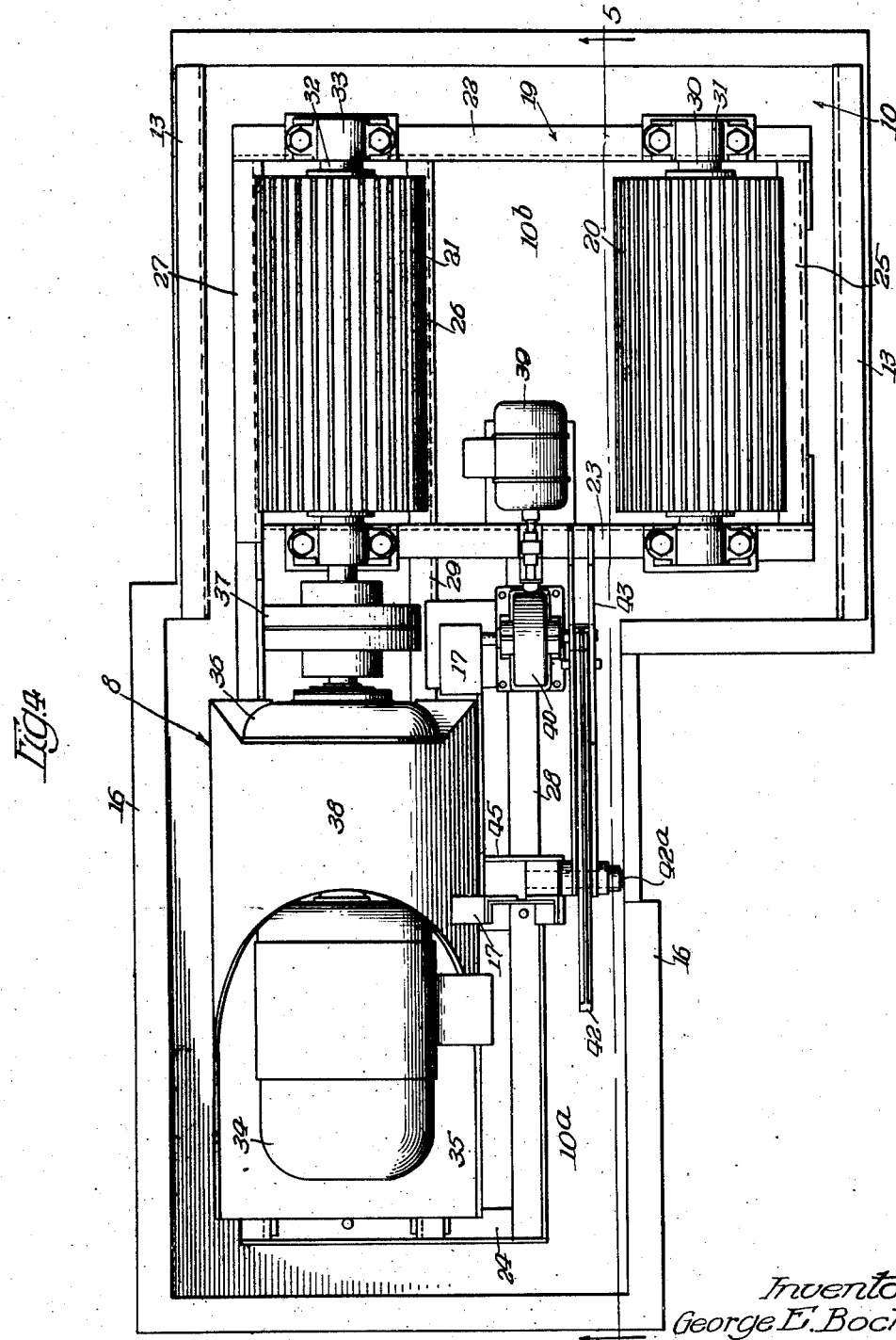

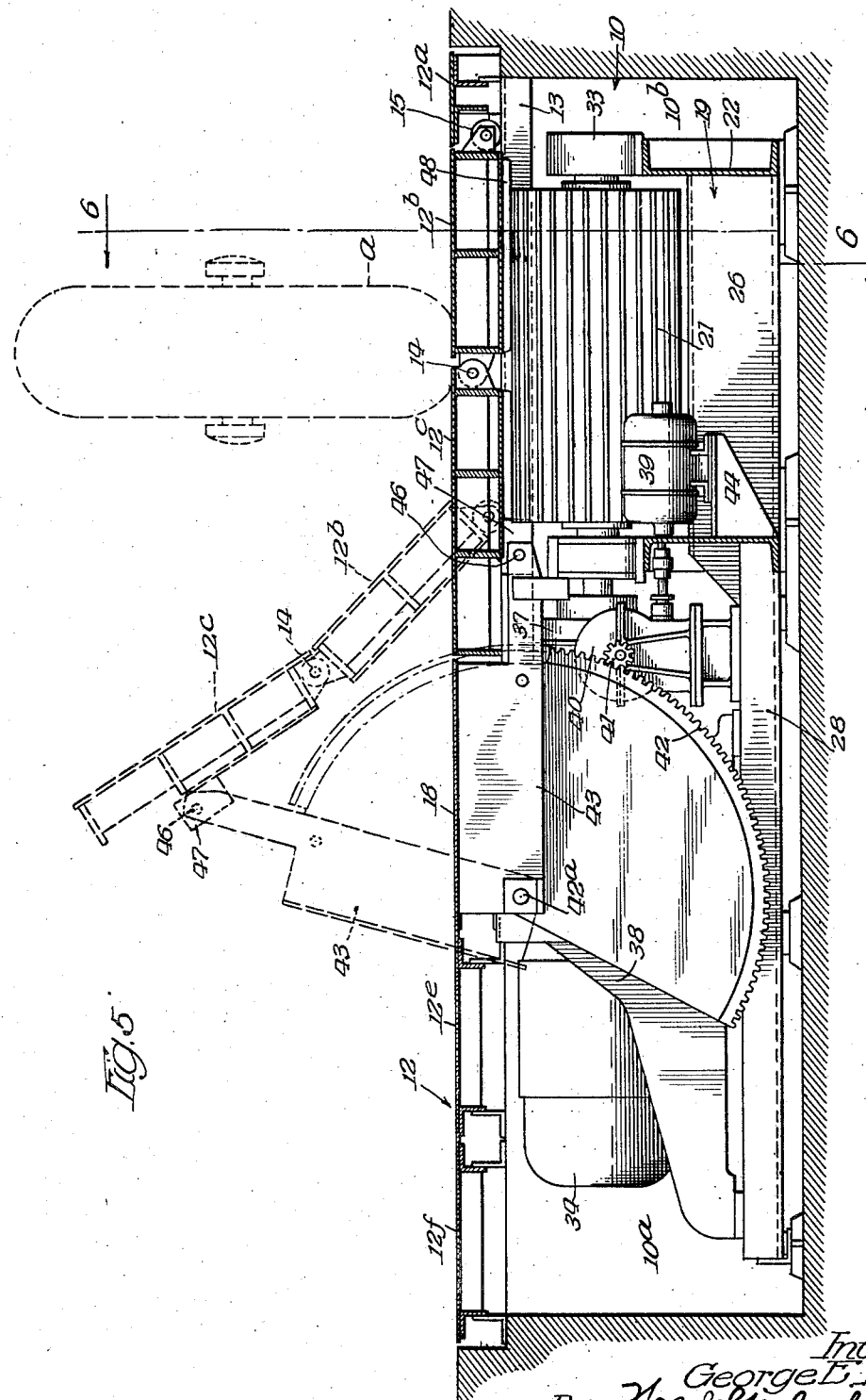

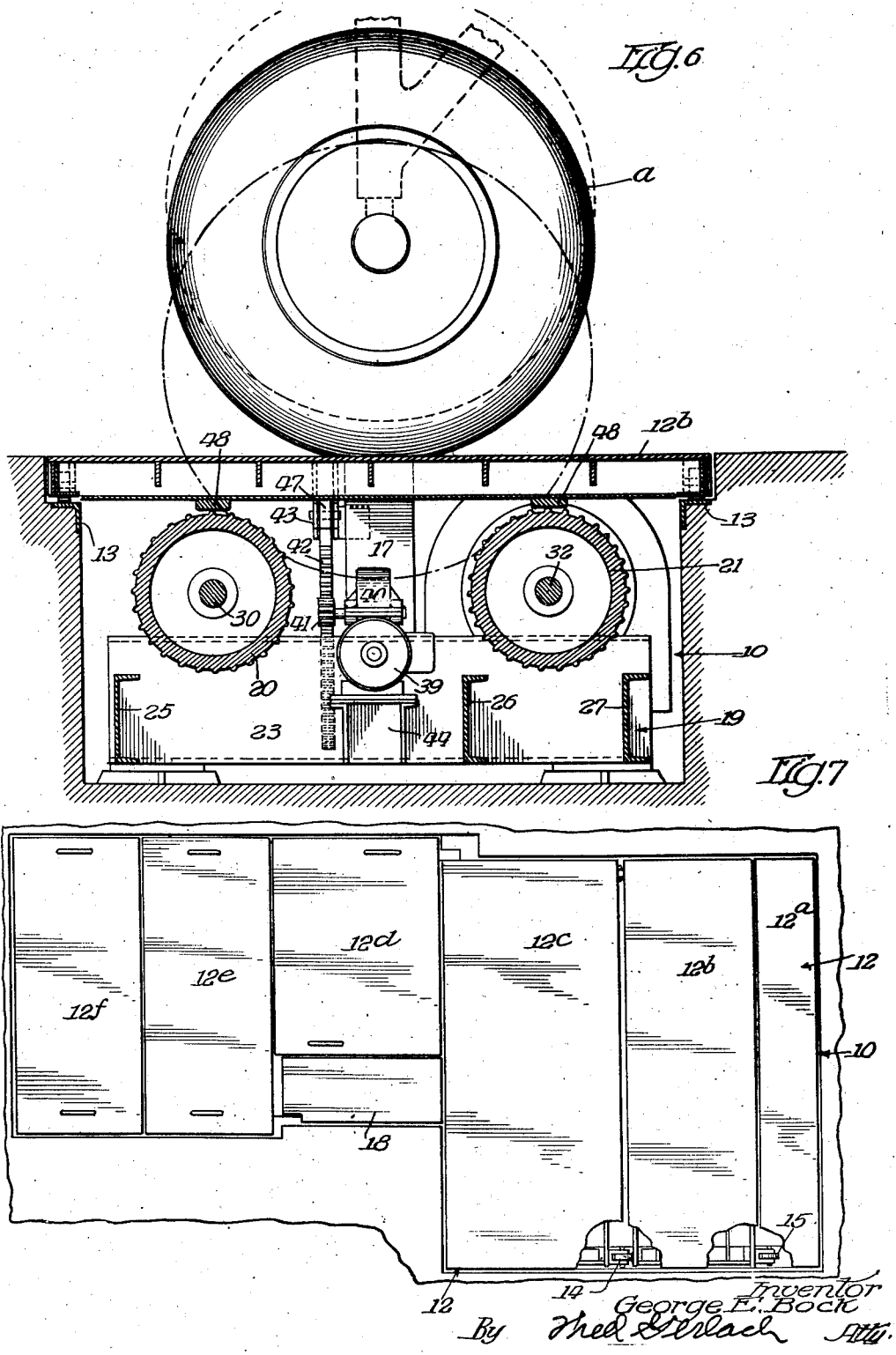

Patented Oct. 15, 1946

2,409,467

UNITED STATES PATENT OFFICE 2,409,467

APPARATUS FOR TESTING THE BRAKES ON AIRPLANE GROUND WHEELS

George E. Bock, Chicago, Ill., assignor to Whiting Corporation, Harvey, Ill., a corporation of Illinois Application January 23, 1943, Serial No. 473,334

5 Claims. (Cl. 73—126)

The present invention relates generally to apparatus for testing brakes on the main ground wheels of an airplane. More particularly the invention relates to that type of airplane brake testing apparatus which comprises a pair of opposed, complemental units each of which is located in a pit and embodies a pair of side by side, horizontally positioned wheel supporting rollers, one of which is an idler and the other of which is connected for drive by a constant speed electric motor.

One object of the invention is to provide an airplane brake testing apparatus of this type which is an improvement upon, and is more efficient than, previously designed brake testing apparatus and is characterized by the fact that it is so designed and constructed that the airplane, the brakes of which are to be tested by the apparatus, is not subjected to any appreciable shock when the wheels thereof are placed on the rollers of the units.

Another object of the invention is to provide an apparatus of the type and character under consideration in which the pits for the two units have covers which are adapted to support the wheels of the airplane when the airplane is rolled or propelled into a brake testing position and are further adapted when the airplane is elevated to a slight extent by way of hydraulic jacks or the like, to be removed or shifted into an open position in order to expose the rollers and permit the airplane to be lowered into a position wherein the main ground wheels are supported on the rollers.

A further object of the invention is to provide an airplane brake testing apparatus of the last mentioned type in which the pit covers are articulate and have associated therewith power means for shifting them back and forth between their open and closed positions.

A still further object of the invention is to provide an airplane brake testing apparatus which is generally of new and improved construction and is characterized by the fact that the two complemental units are both rugged and durable and effectively and efficiently perform their intended function.

Other objects of the invention and the various advantages and characteristics of the present airplane brake testing apparatus will be apparent from a consideration of the following detailed description.

The invention consists in the several novel features which are hereinafter set forth and are more particularly defined by claims at the conclusion hereof.

In the drawings which accompany and form a part of this specification or disclosure and in which like numerals and letters of reference denote corresponding parts throughout the several views:

Figure 1 is a plan view showing an airplane disposed in a brake testing position with respect to a testing apparatus embodying the invention;

Figure 2 is a front view of the airplane showing the wheels thereof while supported on the articulate pit covers that overlie the wheel supporting rollers of the units;

Figure 3 is a front view of the airplane showing it supported by way of jacks and the articulate pit covers shifted into their open position preparatory to lowering the airplane so as to bring the wheels onto the rollers;

Figure 4 is a plan view of the left hand unit, the cover for the pit thereof being omitted;

Figure 5 is a vertical, longitudinal section taken on the line 5—5 of Figure 4 and illustrating in detail the construction and design of the power mechanism for shifting the articulate cover for the pit of the left hand unit back and forth between its open and closed positions;

Figure 6 is a vertical, transverse section taken on the line 6—6 of Figure 5 and showing the design and arrangement of the wheel supporting rollers of the left hand unit; and Figure 7 is a plan view of the articulate cover for the pit for the left hand unit.

The apparatus which is shown in the drawings constitutes the preferred form or embodiment of the invention. It is illustrated in connection with an airplane A having as part of the landing gear thereof a pair of brake equipped opposed main ground wheels $a$ and serves as a medium for testing the brakes for the wheels $a$. As its main or component parts the apparatus comprises a pair of complemental units 8 and 9. These units are positioned one opposite the other and are adapted to support the airplane wheels $a$ in connection with a brake testing operation. The unit 8 is disposed in an L-shaped pit 10 and is designed to support the left hand main ground wheel $a$ of the airplane A. The unit 9 is mounted or disposed in an L-shaped pit 11 and is designed to support the other main ground wheel of the airplane, i. e., the right hand wheel $a$.

The pit 10 for the left hand unit, i. e., the unit 8, is of uniform depth and comprises an inner leg $10^a$ and an outer leg $10^b$. The inner leg is arranged or located so that it extends spanwise of the wing of the airplane A when the airplane is in its brake testing position. The outer leg $10^b$ of the pit 10 is in communication with, and leads forwards from, the inner leg $10^a$ and extends at right angles to the latter. The pit 10 is normally closed by a composite cover 12 which, when in its closed position, is flush with the surface or other foundation in which the pit 10 is formed. As shown in Figure 7 of the drawings, the cover 12 comprises a plurality of sections $12^a$, $12^b$, $12^c$, $12^d$, $12^e$ and $12^f$ and these are arranged in series form and extend transversely of the pit 10. The cover sections $12^a$, $12^b$ and $12^c$ serve to cover or close the outer leg $10^b$ of the pit 10 and the cover sections $12^d$, $12^e$ and $12^f$ serve as a closure medium for the inner leg $10^a$ of the pit. The cover section $12^a$ extends across the outer end of the pit leg $10^b$ and is supported at the ends thereof on a pair of angle bar type rails 13 which extend along the upper portions of the front and rear walls of the pit leg $10^b$ and have horizontally extending flanges. The latter are disposed in shallow grooves along the upper portions of the front and rear walls of the outer leg $10^b$ of the pit 10. The cover section $12^a$ normally remains in place but, however, may be removed in the event access is desired to the portion of the pit below it. The cover section $12^b$ extends normally across the central portion of the pit leg $10^b$ and is supported at the ends thereof by the rails 13. The next section of the cover, i. e., the section $12^c$, extends normally across the inner portion of the leg $10^b$ of the pit and, like the sections $12^a$ and $12^b$, is supported by the ends of the rails 13. The two cover sections $12^b$ and $12^c$ are connected together by pivotal connections 14 and are adapted, as hereinafter described, to be slid or shifted inwards and upwards into an open position as shown by full lines in Figure 3 and by dotted lines in Figure 5. The pivotal connections 14 are disposed at the adjacent corners of the cover sections $12^b$ and $12^c$ and consist of overlapping lugs and pivot pins between the lugs. The cover section $12^b$ is provided at the outer corners thereof with small sized wheels 15 and these are arranged to travel on the rails 13 in connection with shift of the articulate cover sections $12^b$ and $12^c$ back and forth between their open and closed positions. As will be pointed out hereafter, the cover sections $12^b$ and $12^c$ are positioned in their closed position when the airplane is brought or propelled into its brake testing position. When in their closed position such cover sections are flush with the ground or foundation in which the pit 10 is formed and underlie and serve to support the left hand main ground wheel $a$ of the airplane A. After the airplane is brought into its brake testing position it is raised a small distance by way of a pair of hydraulic jacks J (see Figures 2 and 3). Thereafter the articulate cover sections $12^b$ and $12^c$ are shifted into their open position and the airplane is lowered by proper manipulation of the jacks. The jacks are generally placed under the outboard sections of the wing of the airplane and are preferably of the tripod type. The cover sections $12^b$ and $12^c$ are formed of plate steel and are so designed or constructed that they are capable of supporting the portion of the airplane which is disposed thereover when the airplane is in its brake testing position. The cover sections $12^d$, $12^e$ and $12^f$ are normally fixed or stationary and extend across the outer end, central portion, and inner end of the inner pit leg $10^a$, respectively. They are, however, removable in order to provide access to the pit leg $10^a$ and have handles at the ends thereof whereby they may be manipulated in connection with removal or installation thereof. The cover sections $12^e$ and $12^f$ are supported at their ends by a pair of horizontally extending angle bar type rails 16 which are disposed along the upper portions of the front and rear walls of the inner leg $10^a$ of the pit 10. The rear end of the cover section $12^d$ is supported on the rail 16 at the upper portion of the rear wall of the pit leg $10^a$ and the front end of the cover section $12^d$ terminates short of the other rail and is supported on a bracket 17 in the pit 10. The space between the front end of the cover section $12^d$ and the adjacent end of the rail 16 that extends along the upper portion of the front wall of the pit leg $10^a$ is normally closed or covered by a plate 18.

The left hand unit 8 in the pit 10 is of unitary design and comprises a supporting frame 19 and a pair of side by side, horizontally extending rollers 20 and 21. The frame is L-shaped in conformity with the contour of the pit, and rests on the pit bottom. It serves as a supporting medium for the rollers 20 and 21 and embodies a pair of laterally spaced, transversely extending channel beams 22 and 23 in the outer leg $10^b$ of the pit 10, a transversely extending angle bar 24 in the inner end of the inner pit leg $10^a$ and a plurality of longitudinally extending beams 25, 26, 27, 28 and 29. The channel beams 22 and 23 extend from the rear wall of the pit leg $10^b$ to the front wall and are maintained in spaced relation by the longitudinally extending beams 25, 26 and 27. The beam 27 is located adjacent the rear wall of the pit leg $10^b$ and has the inner end thereof extended to connect to the angle bar 24. The beams 28 and 29 are located in the inner leg $10^a$ of the pit and extend between, and serve to space apart, the angle bar 24 and the channel beam 23. The various elements or parts of the frame are preferably welded together in order that the frame as a whole is rigid. The roller 20 is located in the front portion of the pit leg $10^b$ and is disposed in parallel relation with the pit leg $10^a$. It is an idler roller and embodies a supporting shaft 30, the ends of which are mounted in bearings 31 on the front ends of the channel beams 22 and 23. Preferably the periphery of the roller 20 is ribbed or fluted for wheel gripping purposes. The roller 21 is located in the rear portion of the outer leg $10^b$ of the pit 10 and is disposed in parallel relation with the idler roller 20. It embodies a ribbed or fluted periphery like that of the idler roller and has a longitudinal supporting shaft 32, the ends of which are journalled in bearings 33 on the rear ends of the channel beams 22 and 23 of the frame 19. In connection with a brake testing operation the left hand wheel of the airplane to be tested is lowered onto the two rollers 20 and 21, as shown by dotted lines in Figure 6, and when in place is supported by the rollers. The roller 21 is driven by way of a constant speed electric motor 34. The latter is mounted on a platform 35 over the inner ends of the beams 27 and 29 and is disposed in coaxial relation with the supporting shaft 32 for the roller 21. The end of the armature shaft of the electric motor that projects in the direction of the roller 21 is connected to the drive shaft of a speed reducer 36. The driven shaft of the speed reducer is connected to the inner end of the supporting shaft 32 of the roller 21 by way of a coupling 37. The speed reducer 36 is mounted on the outer end of the platform 35 and is protected by a housing 38. During use of the left hand unit 8 the electric input for the motor 34 serves as an actual measure of the brake drag and is measured by a watt meter (not shown). When the left hand main ground wheel of the airplane is in place on the rollers 20 and 21 and the motor 34 for driving the roller 21 is supplied with current the current input, as recorded on the watt meter, shows the drag of the brake for the wheel.

In addition to the parts heretofore enumerated the left hand unit 8 of the apparatus comprises power means for shifting the articulate cover sections 12$^b$ and 12$^c$ back and forth between their open and closed positions. This means comprises an electric motor 39, a speed reducer 40, a pinion 41, a sector shaped gear 42, and a pair of arms 43. The motor 39 is of the reversible type and is mounted between the rollers 20 and 21 on a bracket 44. The latter is welded or otherwise fixedly secured to the central portion of the outer face of the channel beam 23. The motor 39 is disposed in parallel relation with the two rollers and has the inner end of the armature shaft thereof connected to the drive shaft of the speed reducer 40. As shown in Figures 4 and 5, this speed reducer is mounted on a bed plate which extends across the outer ends of the longitudinally extending beams 28 and 29 of the frame 19. The driven shaft of the speed reducer 40 extends at right angles to the drive shaft and is normal to, and overlies, the outer end of the frame beam 28. The pinion 41 meshes with, and serves to drive, the sector shaped gear 42 and is fixed to the front or forward end of the driven shaft of the speed reducer 40. The gear 42 is disposed adjacent the front wall of the inner leg 10$^a$ of the pit and is mounted on a stub axle 42$^a$ so that it is capable of swinging in a vertical plane. It is normally disposed within the pit, as shown in Figure 5, and carries the arms 43 at the upper portion thereof. The stub axle 42$^a$ extends through a bearing in the apex or central portion of the sector shaped gear 42 and is carried by a bracket 45 which is secured to, and projects laterally from, the housing 38 for the speed reducer 36. The arms 43 extend radially from the stub axle 42$^a$ and are fixed to, and disposed in straddled relation with, the upper portion of the gear 42. They are positioned horizontally when the articulate cover sections 12$^b$ and 12$^c$ are in their closed position and have the distal ends thereof connected by a pivot pin 46 to a lug 47 on the central inner portion of the cover section 12$^c$. When the electric motor 39 is driven in one direction so as to cause the gear 42 to rotate or rock in a counterclockwise direction as viewed in Figure 5, the arms 43 are swung upwards and cause the articulate cover sections 12$^b$ and 12$^c$ to slide inwards and upwards as shown by dotted lines in Figure 5. Reverse drive of the electric motor 39 causes the gear 42 to rotate or rock in a clockwise direction as viewed in Figure 5, and results in the arms 43 sliding the articulate cover sections 12$^b$ and 12$^c$ downwards and outwards into their closed position wherein they overlie the rollers 20 and 21. Limit switches (not shown) are preferably provided in order to control the motor so that it stops automatically when the articulate cover sections reach their full open position and their full closed position. The cover sections 12$^b$ and 12$^c$ are so dimensioned or proportioned that they fully overlie the rollers 20 and 21 when they are in their closed position. They are provided on the bottom portions thereof with shoes 48 which rest on the top portions of the two rollers when the two sections are in their closed position. The shoes 48 extend lengthwise of the rollers and are in sliding engagement therewith. By employing shoes the two articulate cover sections 12$^b$ and 12$^c$ are supported, not only by the rails 13, but also by the rollers when they are in their closed position. During shift of the cover sections 12$^b$ and 12$^c$ out of and into their closed position the small sized wheels 15 on the outer corners of the cover section 12$^b$ ride or travel on the rails 13 as heretofore described. When the cover sections 12$^b$ and 12$^c$ are in their closed position the upper surfaces thereof are flush with the upper surfaces of the other sections of the cover 12 and permit the left hand ground wheel $a$ of the airplane A to be rolled onto them. The plate 18 serves to complete the cover 12 and is mounted on the upper inner portion of the arms 43. When the arms are horizontally disposed while the articulate cover sections are in their closed positions, the plate 18 is flush with all the sections of the cover.

The L-shaped pit 11 for the right hand unit 9, i. e., the unit for supporting the right hand main ground wheel $a$ of the airplane A in connection with a brake testing operation, is positioned opposite to the pit 10 (see Figure 1), but is reversely arranged. It is spaced from the pit 10 so that the outer leg thereof is beneath the right hand wheel $a$ of the airplane when the airplane is in its brake testing position with respect to the apparatus. A composite cover 49, exactly like the cover 12, serves as a medium for closing or covering the pit 11. It includes certain normally stationary sections and two articulate sections corresponding to the sections 12$^b$ and 12$^c$ of the cover 12.

The unit 9 for supporting and brake testing the right hand main ground wheel $a$ of the airplane A is the same as the unit 8 except that it is reversely positioned. It functions or operates in the same manner as the unit 8 and comprises a frame 50 in the pit 11, a pair of wheel supporting rollers 51 and 52, an electric motor 53 for driving the roller 52 and power means for shifting the articulate sections of the cover 49 back and forth between their open and closed positions. The power means is identical to the power means of the unit 8 for actuating the articulate cover sections 12$^b$ and 12$^c$ of the cover 12 and comprises an electric motor (not shown), a speed reducer (also not shown), a pinion 54, a sector shaped gear 55 and a pair of arms 56. The electric motor of the power means for actuating the articulate cover sections of the cover 49 for the pit 11 is of the reversible variety, the same as the electric motor 39.

In using the improved brake testing apparatus the airplane A to be tested is propelled so as to bring the main ground supporting wheels $a$ thereof onto the articulate sections of the pit covers, as shown in Figure 2. Thereafter the hydraulic jacks J are placed under the outboard wing sections of the airplane and are manipulated so as to elevate the airplane sufficiently to bring the main ground wheels out of engagement with the aforementioned articulate cover sections. After the airplane is elevated by way of the jacks to the desired or proper extent the articulate sections of the pit covers are shifted inwards and upwards into their open position by actuation of the aforementioned power means therefor. When the articulate sections of the two pit covers are in their open position, as shown in Figure 3, the main ground wheels $a$ of the airplane A are disposed over the brake testing rollers in the outer legs of the two pits. After opening of the pit covers by inward and upward sliding of the articulate cover sections the jacks J are actuated or manipulated so as to lower the airplane into a position wherein the ground wheels *a* rest on the rollers. Thereafter the electric motors 34 and 53 are started so as to effect drive of the driven rollers 21 and 52. During drive of the driven rollers the brakes are set or adjusted so as to equalize their drag on the ground wheels *a*. At the conclusion of the brake testing operation the jacks are actuated so as to elevate the airplane A and the articulate sections of the two pit sections are then shifted outwards and downwards into their closed position wherein they overlie the rollers and are so arranged as to support the ground wheels upon lowering of the airplane.

The herein described brake testing apparatus effectively and efficiently fulfills its intended function and is characterized by the fact that when it is properly manipulated the airplane to be tested is not subjected to any appreciable shock when the main ground wheels thereof are placed on the testing rollers of the units. By eliminating shock to the airplane being tested, the possibility of injuring the radio and other delicate instruments for the airplane is avoided. The apparatus is further characterized by the fact that the two complemental units thereof are both rugged and durable and the articulate sections of the pit covers are so designed and constructed that they are capable of supporting the airplane when the ground wheels are rolled thereon preparatory to a brake testing operation.

The invention is not to be understood as restricted to the details set forth since these may be modified within the scope of the appended claims without departing from the spirit and scope of the invention.

Having thus described the invention what I claim as new and desire to secure by Letters Patent is:

1. The combination with a pit having therein a pair of side by side rollers for use in testing the brake on a vehicle wheel, of a platform type element at the top of the pit mounted so that it is shiftable back and forth lengthwise of the rollers between an operative position wherein it overlies, and is supported directly on, the rollers and an inoperative position wherein it is free or clear of said rollers, and adapted and designed, when in its operative position, to have the vehicle wheel propelled thereon and to support said wheel, and further adapted, upon elevation of the wheel, to be shifted into its inoperative position so as to permit the wheel to be lowered into operative relation with the brake testing rollers, and means including an electric motor and gearing in the pit for shifting the element back and forth between its operative and inoperative positions.

2. The combination with a pit having means therein for testing a vehicle wheel brake, of a cover for the pit embodying a part mounted so that it is shiftable back and forth between an operative position wherein it overlies the means and an inoperative position wherein it is disposed upwards and to one side of said means, adapted and designed when in its operative position to have the vehicle wheel propelled thereon and to support said wheel, and further adapted upon elevation of the wheel to be shifted into its inoperative position so as to permit the wheel to be lowered into engagement with the brake testing means, and power actuated means for moving the cover part back and forth between its operative and inoperative positions, comprising an arm in the pit having one end thereof pivotally connected to said cover part.

3. The combination with a pit having therein a pair of side by side horizontally disposed rollers for use in testing a vehicle wheel brake, of a cover for the pit embodying a plurality of pivotally connected sections mounted so that they are shiftable back and forth lengthwise of the rollers between an operative position wherein they are supported directly on the rollers and an inoperative position wherein they are disposed upwards and to one side of said rollers, adapted and designed, when in their operative position, to have the vehicle wheel propelled thereon and to support said wheel, and further adapted, upon elevation of the wheel, to be shifted to their inoperative position so as to permit the wheel to be lowered into operative relation with the brake testing rollers, and power actuated means in the pit for moving said sections back and forth between their operative and inoperative positions.

4. The combination with a pit having therein a pair of side by side rollers for use in testing a vehicle wheel brake, of a composite cover for the pit comprising normally stationary but removable sections above and outwards of the rollers and a plurality of articulate sections mounted so that they are shiftable back and forth between an operative position wherein they overlie the rollers and an inoperative position wherein they are disposed upwards and to one side of the rollers, adapted and designed, when in their operative position, to have the vehicle wheel propelled thereon and to support said wheel, and further adapted, upon elevation of the wheel, to be shifted to their inoperative position so as to permit the wheel to be lowered into operative relation with the brake testing rollers, and power actuated means in the pit for shifting the articulate cover sections back and forth between their operative and inoperative positions, said means being disposed for the most part beneath the normally stationary sections when the latter are in place and being accessible upon the removal of the last mentioned sections.

5. The combination with a pit having therein a pair of side by side rollers for use in testing the brake of a vehicle wheel, of a composite cover for the pit comprising normally stationary but removable sections to one side of the rollers, a plurality of articulate sections mounted so that they are shiftable back and forth lengthwise of the rollers between an operative position wherein they overlie and are supported directly on the rollers and an inoperative position wherein they extend upwards and to one side of the rollers and expose the latter, adapted and designed, when in their operative position to have the vehicle wheel propelled thereon and to support said wheel, and further, adapted, upon elevation of the wheel, to be shifted to their inoperative position so as to permit the wheel to be lowered into operative relation with the brake testing rollers, and power actuated means in the pit for shifting the articulate cover sections back and forth between their operative and inoperative positions, including a swing type arm having one end thereof mounted for pivotal movement on a fixed pivot and its other end pivotally connected to one of the articulate sections.

GEORGE E. BOCK.